(12) United States Patent
Qu et al.

(10) Patent No.: US 11,879,880 B2
(45) Date of Patent: Jan. 23, 2024

(54) INTEGRATED MACHINES AND METHODS FOR PERFORMING FULLY-AUTOMATED BIOLOGICAL EVALUATION AND CHEMICAL ANALYSIS

(71) Applicant: RESEARCH CENTER FOR ECO-ENVIRONMENTAL SCIENCES, CHINESE ACADEMY OF SCIENCES, Beijing (CN)

(72) Inventors: Guangbo Qu, Beijing (CN); Qianchi Ma, Beijing (CN); Yanna Liu, Beijing (CN); Jianbo Shi, Beijing (CN); Guibin Jiang, Beijing (CN)

(73) Assignee: Research Center for Eco-Environmental Sciences, Chinese Academy of Sciences, Beijing (CN)

( * ) Notice: Subject to any disclaimer, the term of this patent is extended or adjusted under 35 U.S.C. 154(b) by 65 days.

(21) Appl. No.: 17/276,447

(22) PCT Filed: Jul. 17, 2019

(86) PCT No.: PCT/CN2019/096280
§ 371 (c)(1),
(2) Date: Mar. 15, 2021

(87) PCT Pub. No.: WO2021/007794
PCT Pub. Date: Jan. 21, 2021

(65) Prior Publication Data
US 2022/0128528 A1    Apr. 28, 2022

(51) Int. Cl.
*G01N 30/88* (2006.01)
*G01N 30/72* (2006.01)
(Continued)

(52) U.S. Cl.
CPC ............. *G01N 30/88* (2013.01); *G01N 30/72* (2013.01); *G01N 30/8606* (2013.01);
(Continued)

(58) Field of Classification Search
CPC .... G01N 30/72; G01N 30/48; G01N 30/8606; G01N 2030/027; G01N 2030/8804;
(Continued)

(56) References Cited

U.S. PATENT DOCUMENTS

2004/0043503 A1    3/2004    Liao et al.
2004/0235187 A1    11/2004   LaCourse et al.
(Continued)

FOREIGN PATENT DOCUMENTS

CN    101294975 A    10/2008
CN    101598739 A    12/2009
(Continued)

OTHER PUBLICATIONS

International Search Report dated Apr. 17, 2020, corresponding to International Application No. PCT/CN2019/096280.

*Primary Examiner* — Jill A Warden
*Assistant Examiner* — Michael Paul Shimek
(74) *Attorney, Agent, or Firm* — Knobbe, Martens, Olson & Bear, LLP (57) ABSTRACT

Machines and methods are for performing fully-automated biological evaluation and chemical analysis. A pretreatment module is used in treatments of enriching, concentrating and purifying a sample to be analyzed. A component separation module is used for carrying out separation of multiple compounds in mother liquor to be analyzed. A monitoring and identifying module is for monitoring and collecting chromatographic signals of the separated liquid effluent in real time, as well as quantitative detection of suspicious compounds. A component collection module is used in
(Continued)

operations of collecting, transferring and dissolving, redissolving, and pipetting the separated liquid effluent. A biological evaluation module is for cell culture and detection of cytotoxic effect and toxic targets. A data processing and automated control module is for acquisition, arrangement and analysis of the integrated data. The machines and methods provide an efficient, stable and normalized standard operation condition for the screening of toxicity of compounds.

7 Claims, 2 Drawing Sheets

(51) Int. Cl.
  *G01N 30/86* (2006.01)
  *G01N 30/02* (2006.01)
  *H01J 49/40* (2006.01)
  *B01J 20/291* (2006.01)
(52) U.S. Cl.
  CPC ....... *B01J 20/291* (2013.01); *G01N 2030/027* (2013.01); *H01J 49/40* (2013.01)

(58) Field of Classification Search
  CPC ... G01N 2030/8813; G01N 2030/8881; G01N 30/88; B01J 20/291; H01J 49/40
  See application file for complete search history.

(56) References Cited

U.S. PATENT DOCUMENTS

| | | | |
|---|---|---|---|
| 2015/0056689 A1* | 2/2015 | DeWitte | G01N 30/72 422/65 |
| 2015/0066388 A1* | 3/2015 | Katsuyama | G01N 30/8658 702/31 |
| 2016/0025760 A1* | 1/2016 | Holmes | G01N 33/54306 435/7.1 |

FOREIGN PATENT DOCUMENTS

| CN | 101692093 A | | 4/2010 |
|---|---|---|---|
| CN | 101294975 A | * | 6/2013 |
| CN | 103889533 A | | 6/2014 |
| CN | 104007277 A | | 8/2014 |

* cited by examiner

INTEGRATED MACHINES AND METHODS FOR PERFORMING FULLY-AUTOMATED BIOLOGICAL EVALUATION AND CHEMICAL ANALYSIS

TECHNICAL FIELD

The present invention relates to a toxicology analyzer, and in particular, to integrated machines and methods for fully-automated biological evaluation and chemical analysis for high-throughput screening of toxic compounds, belonging to the technical field of chemical analysis and toxicity determination.

BACKGROUND

A combination of chemical analysis and toxicity determination techniques can effectively solve the difficult problem of qualitative and quantitative detection of conventional toxic chemicals, however, complex analysis and detection procedures and throughput bottleneck limitations are obstacles to be overcome. A high-throughput screening technique is a technique based on in vitro experiment methods at a molecular or cell level, which uses a microplate and a liquid workstation as an experimental carrying vehicle and a liquid processing equipment, is equipped with chemical analysis instruments with high quality precision and high resolution, collects experiment results, and finally analyzes and processes experimental data by a computer. Since the entire process of the high-throughput screening technique is performed by an automated operation system, a large number of candidate compounds can be screened in a short period of time, and the high-throughput screening technique is widely applied to subjects such as chemistry, genetics, and pharmacology, etc.

A Chinese patent for invention with publication number CN101294975A discloses an Integrated Toxicology Analyzer, which consists of six modules, a component separation module, a component collection module, an automated mechanical arm module, a solvent processing platform, a compound determination module, and a data processing and control system. The Analyzer can complete the relatively complicated work of three parts, i.e., sample applications of sample separation, component analysis and bioactivity analysis, on line in a high-throughput fashion, thereby greatly reducing the dependence on operators, while improving the efficiency of the related work and the reliability of the evaluation result. However, the analyzer has the following limitations:

1) the sample used in the analyzer cannot be loaded and separated in the component separation module until it is pretreated in a laboratory; 2) the component collection module of the analyzer can only determine the method and flow of collection of components via pre-experiments in advance, but there is experimental errors in the pre-experiments and the actual collecting process; 3) a 96-well plate of the analyzer needs to be put back on a plate storing scaffold after the samples are applied, and the plate is manually and collectively taken out for subsequent biological activity assay after the whole procedure is finished, which increases a risk of introducing pollution by in vitro toxicological experiments; 4) the result of compound determination and the result of biological detection from the analyzer are mutually independent, causing a difficulty in eliminating the false positive phenomenon present in the test result; 5) the mechanical arm of the analyzer is standalone as an auxiliary equipment, and no effective integration scheme is established among modules, thus reducing the efficiency and throughput of the whole experiments; 6) the analyzer can only partially complete the identification of pollutants in a complex system, and a part of experimental work depend on other auxiliary instruments and fields.

SUMMARY

With regard to the above problems, the objective of the present invention is to provide integrated machines and methods for performing fully-automated biological evaluation and chemical analysis for high-throughput screening of toxic compounds.

In order to achieve the above objectives, the following technical solutions are adopted by the present invention: an integrated machine for performing fully-automated biological evaluation and chemical analysis comprising: a pretreatment module mainly used in the treatments such as enriching, concentrating and purifying of a sample to be analyzed to provide a mother liquor to be analyzed; a component separation module, an inlet of the component separation module is connected with the pretreatment module and an outlet of the component separation module is connected with an inlet of a three-way diverter valve, the component separation module is used for carrying out the separation of multiple compounds in the mother liquor to be analyzed; a monitoring and identifying module, an inlet of the monitoring and identifying module is connected with a first outlet of the three-way diverter valve for monitoring and collecting chromatographic signals of the separated liquid effluent in real-time, as well as quantitative detection of suspicious compounds; a component collection module, an inlet of the component collection module is connected with a second outlet of the three-way diverter valve, and an outlet of the component collection module is split into two paths, an outlet of a first path is connected with the component separation module used in the operations such as collecting, transferring and dissolving, redissolving, and pipetting the separated liquid effluent; a biological evaluation module connected with an outlet of a second path of the component collection module, for cell culture and detection of cytotoxic effect and toxic targets; and a data processing and automated control module electrically connected with the monitoring and identifying module and the biological evaluation module, respectively, for completing acquisition, arrangement and analysis of the integrated data.

The integrated machine for performing fully-automated biological evaluation and chemical analysis, preferably, the pretreatment module essentially consists of a solid phase extractor, an accelerated solvent extractor, a gel chromatograph, and a quantitative concentrator; if the sample to be analyzed is liquid, loading and enrichment of the sample to be analyzed are carried out via the solid phase extractor, and then a proper leachate is selected for elution and extraction of the multiple compounds; if the sample to be analyzed is solid, the multiple compounds are extracted from the sample to be analyzed via the accelerated solvent extractor; after the extract generated by the solid phase extractor or the accelerated solvent extractor is concentrated via the quantitative concentrator, the resulting concentrate is purified in the gel chromatography to provide the mother liquor to be analyzed.

The integrated machine for performing fully-automated biological evaluation and chemical analysis, preferably, the component separation module essentially consists of a high-pressure liquid pump, a sample injector, a chromatographic column for analysis, a chromatographic column for preparation, and a column oven; wherein, the high-pressure liquid pump and the sample injector are used for introducing the mother liquor to be analyzed, which is concentrated and purified by the pretreatment module, into the component separation module, the chromatographic column for analysis or the chromatographic column for preparation is used for crude separation of the introduced mother liquor to be analyzed, and the column oven is used for providing a constant column temperature during separation.

The integrated machine for performing fully-automated biological evaluation and chemical analysis, preferably, the monitoring and identifying module essentially consists of an ultraviolet detector in tandem with a high-resolution mass spectrometer detector, after the liquid effluent introduced into the monitoring and identifying module sequentially passes through the ultraviolet detector and the high-resolution mass spectrometer detector, a spectrogram of chromatography-mass spectrometry of the liquid effluent is obtained.

The integrated machine for performing fully-automated biological evaluation and chemical analysis, preferably, the component collection module essentially consists of a plate storing scaffold, a mechanical arm, a fraction collector, a nitrogen blower, a pipetting workstation, and a mounting scaffold; wherein, the plate storing scaffold is arranged on a first side of the mounting scaffold for storing the plate; the mechanical arm is mounted at the top of the mounting scaffold for transferring the plate; the fraction collector is mounted on a second side of the mounting scaffold and connected with the second outlet of the three-way diverter valve for collecting the liquid effluent split and flowed from the component separation module into the plate; the nitrogen blower is mounted on a third side of the mounting scaffold for nitrogen blowing the liquid effluent transferred by the fraction collector in the plate to dryness; the pipetting workstation is mounted on a fourth side of the mounting scaffold for gradient dilution of a sample or positive control mother liquor and solution preparation.

The integrated machine for performing fully-automated biological evaluation and chemical analysis, preferably, the biological evaluation module essentially consists of an automated liquid distributor, a $CO_2$ incubator, a refrigerator, a plate washer, and a biological evaluation detector; wherein, the automated liquid distributor is arranged on the mounting scaffold above the nitrogen blower for redissolution by distributing a constant volume of organic solvent into the plate transferred from the nitrogen blower; the $CO_2$ incubator is arranged between the automated liquid distributor and the fraction collector for cell culture and exposure to administration; the refrigerator is arranged outside the $CO_2$ incubator for preserving the remaining redissolved solution; the plate washer is arranged on the mounting scaffold below the nitrogen blower for washing the plate where cell culture is completed; the biological evaluation detector is arranged above the $CO_2$ incubator for detecting the biological effect signals of the administered plate where administration exposure is completed.

A method for performing fully-automated biological evaluation and chemical analysis based on the above integrated machine for fully-automated biological evaluation and chemical analysis, comprising the steps of:
step 1: extracting, concentrating, and purifying the mother liquor to be analyzed of the sample to be analyzed in a pretreatment module;
step 2: the concentrated and purified mother liquor to be analyzed enters the component separation module through the high-pressure liquid pump and the sample injector, and then after crude separation by an chromatographic column for analysis or a chromatographic column for preparation, a liquid effluent is split into two paths in a three-way diverter valve in a proportion, and enters the monitoring and identifying module and the component collection module, respectively;
step 3: the liquid effluent entering the monitoring and identifying module sequentially passes through the ultraviolet detector and the high-resolution mass spectrometer detector prior to obtainment of a spectrogram of chromatography-mass spectrometry of the liquid effluent, and the data processing and automated control module acquires the spectrogram of chromatography-mass spectrometry of the liquid effluent;
step 4: the mechanical arm in the component collection module grabs a plate in the plate storing scaffold and places it on the fraction collector, and the liquid effluent entering the component collection module after being split is collected into the plate via the fraction collector; the mechanical arm transfers the plate to the nitrogen blower for nitrogen blowing the liquid effluent in the plate to dryness, and then transfers the plate to the automated liquid distributor for redissolution by distributing a constant volume of organic solvent into the plate; after distributing an appropriate amount of redissolved solution into another plate and nitrogen blowing it to dryness again, then redissolution is performed with a biocompatible solvent to provide a mother liquor for administration, and the remaining redissolved solution is preserved in the refrigerator; an appropriate amount of mother liquor for administration and an appropriate amount of positive control mother liquor taken from the outside each are formulated with an appropriate amount of complete culture media suitable for cell growth into a sample exposure liquid and a positive control exposure liquid, respectively, at the pipetting workstation, and sample application of the sample exposure liquid and the positive control exposure liquid to the plate for administration is performed;
step 5: the plate for administration after the sample application is transferred to the $CO_2$ incubator via the mechanical arm for exposure to administration; the plate for administration is transferred to the biological evaluation detector for detection of the biological effect signal after exposure to administration is completed; the biological effect signal of each cell in the plate for administration is acquired and a biological assay effect spectrogram is reconstructed by the data processing and automated control module;
step 6: the spectrogram of chromatography-mass spectrometry is overlapped with the biological assay effect spectrogram by the data processing and automated control module to complete a primary screening of the biological effect activity of the mother liquor to be analyzed and determination of biological effect active components;
step 7: if the biological effect active components are still a complex mixture, steps 2-6 are repeated using the remaining redissolved solution in step 4 as a mother liquor to be analyzed, for the purpose of a further subdivision of the biological effect active components;
step 8: after the subdivided biological effect active components are determined, the remaining redissolved solution in step 4 is taken and injected into the monitoring and identifying module for identification by high-resolution mass spectrometry, so as to acquire accurate mass-to-charge ratios and secondary fragment information of suspicious effectors; finally, alignment and screening of a chromatographic library of the suspicious effectors are carried out by the data processing and automated control module and a list of the suspicious effectors is obtained.

The method for performing fully-automated biological evaluation and chemical analysis, preferably, in the step 4, the steps of acquiring a plate for administration are as follows:

step ①: a plate is grabbed by the mechanical arm in the component collection module from the plate storing scaffold, and after a cover is removed, the plate is rapidly distributed with liquid for cells dispensing using the automated liquid distributor in the biological evaluation module, and transferred to the $CO_2$ incubator for cell culture after the cover is recovered;

step ②: after the cell culture is completed, the plate is transferred from the $CO_2$ incubator to the plate washer, where the initial culture medium is washed off using a phosphate buffer solution to provide a plate for administration.

The method for performing fully-automated biological evaluation and chemical analysis, preferably, the filler in the solid phase extractor in the step 1 is selected from adsorbents with various specifications and sample loadings including, but not limited to, a normal phase polar adsorbent, an anti-phase weak polar adsorbent, and an ion exchange adsorbent;

the gel filler of the gel chromatograph in the step 1 includes, but is not limited to, polyacrylamide, crosslinked dextran, and agarose.

The method for performing fully-automated biological evaluation and chemical analysis, preferably, standard matrix plates including, but not limited to, transparent plates, black/white plates, or deep-well plates having 6, 12, 24, 48, 96 and 384 wells, along with pipette tip boxes with various specifications are stored on the plate storing scaffold;

the biological evaluation detector includes, but is not limited to, a microplate reader, a flow cytometer, a fluorescent quantitative PCR instrument, and a DNA damage detector;

the high-resolution mass spectrometry detector includes, but is not limited to, a time-of-flight mass spectrometry detector and an ion trap high-resolution mass spectrometry detector.

Due to the adoption of the above technical solutions, the present invention has the following advantages: the instrument of the present invention consists of a pretreatment module, a component separation module, a monitoring and identifying module, a component collection module, a biological evaluation module, and a data processing and automated control module, wherein the pretreatment module can complete extraction and concentration of a sample fully automatically, the monitoring and identifying module guides separation and collection processes of components through a real-time online monitoring system, and finally the biological evaluation module completes detection of the biological effect of subcomponents and determines a list of suspicious model compounds. The present invention provides an efficient, stable and normalized standard operation condition for the screening of toxicity of compounds in a complex system, improves the reliability of experimental data while reducing the labor cost required by detection. It is a technical method with stronger practicability in high-throughput screening work, and has a higher spreading value. 2. Due to the addition of a pretreatment module for samples to the present invention, the applicability and universality of the instrument is improved. 3. An on-line detection function is added to the present invention, and a real-time on-line detection of the separation process is achieved by integrating detectors such as an ultraviolet detector and a high-resolution mass spectrometer detector, thereby further optimizing and guiding the separation process. 4. Due to the addition of a biological evaluation module to the present invention, culture, exposure and detection operations during in vitro cell experiments can be carried out by a mechanical arm under sterile conditions. 5. Due to the addition of a function for overlapping alignment of a spectrogram of ultraviolet/mass spectrometry-chromatography with a biological assay spectrogram to the present invention, the occurrence of false positive results can be reduced and the accuracy of identifying effect pollutants can be improved. 6. Basic instruments necessary for a high-throughput test in a complex system are integrated in the present invention, which enables completion of toxic substance screening outside a laboratory, reduces the dependence on the field, and achieves in situ detection of the toxic substances in one time.

DETAILED DESCRIPTION

The objectives, features and advantages of the present invention will be more clearly understood from the following detailed description of the preferred examples of the present invention in conjunction with the accompanying drawings. It is appreciated that the examples shown in the drawings are not intended to limit the scope of the present invention, but are merely intended to illustrate the substantial spirit of the technical solution of the present invention.

Figure 1:
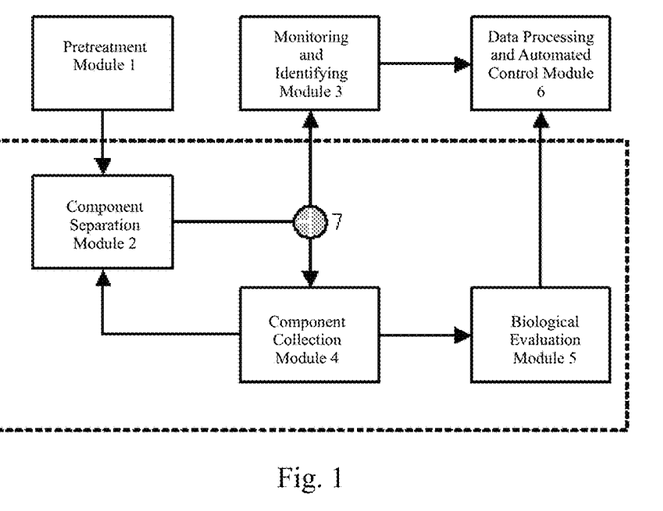
FIG. 1 is a structural block diagram of the integrated machine for performing fully-automated biological evaluation and chemical analysis of the present invention.

As shown in FIG. 1, the present application provides a integrated machine for performing fully-automated biological evaluation and chemical analysis, comprising: a pretreatment module 1 mainly used in the treatments such as enriching, concentrating and purifying of a sample to be analyzed to provide a mother liquor to be analyzed; a component separation module 2, an inlet of the component separation module 2 is connected with the pretreatment module 1, an outlet of the component separation module 2 is connected with an inlet of a three-way diverter valve 7, the component separation module 2 is mainly used for carrying out the separation of multiple compounds in the mother liquor to be analyzed; a monitoring and identifying module 3, an inlet of the monitoring and identifying module 3 is connected with a first outlet of the three-way diverter valve 7 for monitoring and collecting chromatographic signals of the separated liquid effluent in real time, as well as quantitative detection of suspicious compounds; a component collection module 4, an inlet of the component collection module 4 is connected with a second outlet of the three-way diverter valve 7, and an outlet of the component collection module 4 is split into two paths, an outlet of a first path is connected with the component separation module 2, the component collection module 4 is used in the operations such as collecting, transferring and dissolving, redissolving, and pipetting of the separated liquid effluent; a biological evaluation module 5 connected with an outlet of a second path of the component collection module 4 for cell culture and detection of cytotoxic effect and toxic targets; and a data processing and automated control module 6 electrically connected with the monitoring and identifying module 3 and the biological evaluation module 5, respectively, for acquisition, arrangement and analysis of the integrated data.

In the above example, preferably, the pretreatment module 1 essentially consists of a solid phase extractor, an accelerated solvent extractor, a gel chromatograph, and a quantitative concentrator. If the sample to be analyzed is liquid, loading and enrichment of the sample to be analyzed are carried out via the solid phase extractor, and then a proper leachate is selected for elution and extraction of the multiple compounds; if the sample to be analyzed is solid, the multiple compounds are extracted from the sample to be analyzed via the accelerated solvent extractor; after the concentration of the liquid extract generated by the solid phase extractor or the accelerated solvent extractor is completed via the quantitative concentrator, the liquid concentrate is purified in the gel chromatograph to provide the mother liquor to be analyzed.

In the above example, preferably, the component separation module 2 essentially consists of a high-pressure liquid pump, a sample injector, a chromatographic column for analysis, a chromatographic column for preparation, and a column oven. Wherein, the high-pressure liquid pump and the sample injector are used for introducing the mother liquor to be analyzed, which is concentrated and purified by the pretreatment module 1, into the component separation module 2, the chromatographic column for analysis or the chromatographic column for preparation is used for crude separation of the introduced mother liquor to be analyzed, and the column oven is used for providing a constant column temperature during separation.

In the above example, preferably, the monitoring and identifying module 3 essentially consists of an ultraviolet detector in tandem with a high-resolution mass spectrometer detector, and the liquid effluent introduced into the monitoring and identifying module 3 sequentially passes through the ultraviolet detector and the high-resolution mass spectrometer detector to provide a spectrogram of chromatography-mass spectrometry of the liquid effluent.

Figure 2:
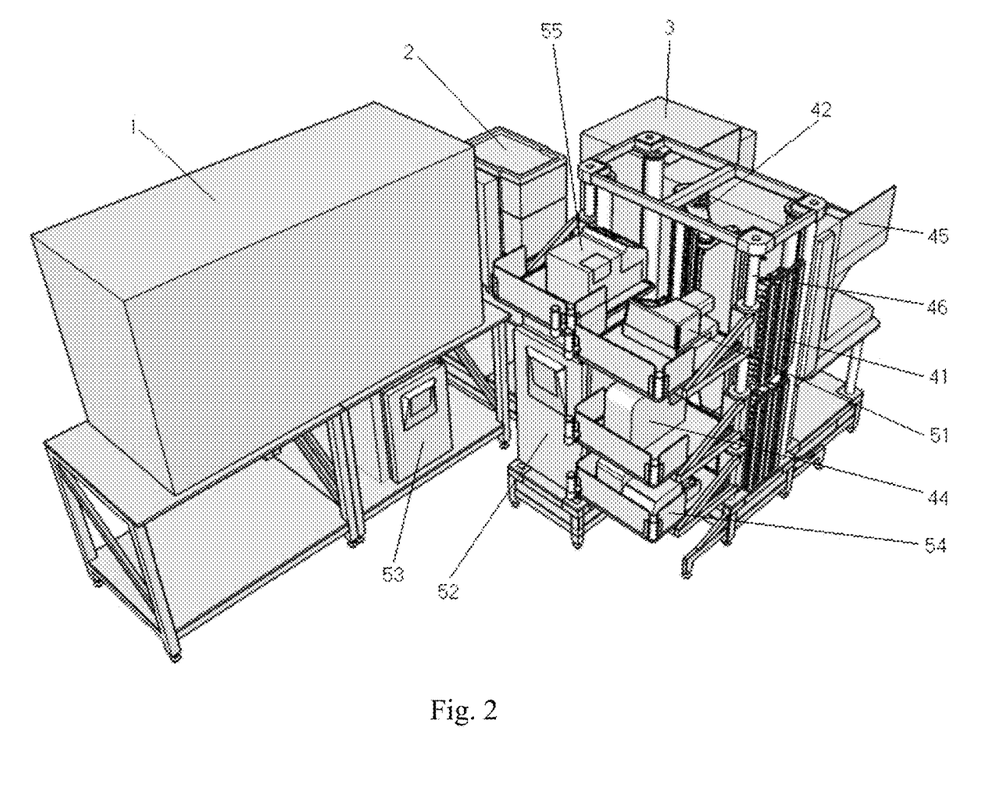
FIG. 2 is a structural schematic of the integrated machine for performing fully-automated biological evaluation and chemical analysis of the present invention from a front view.
Figure 3:
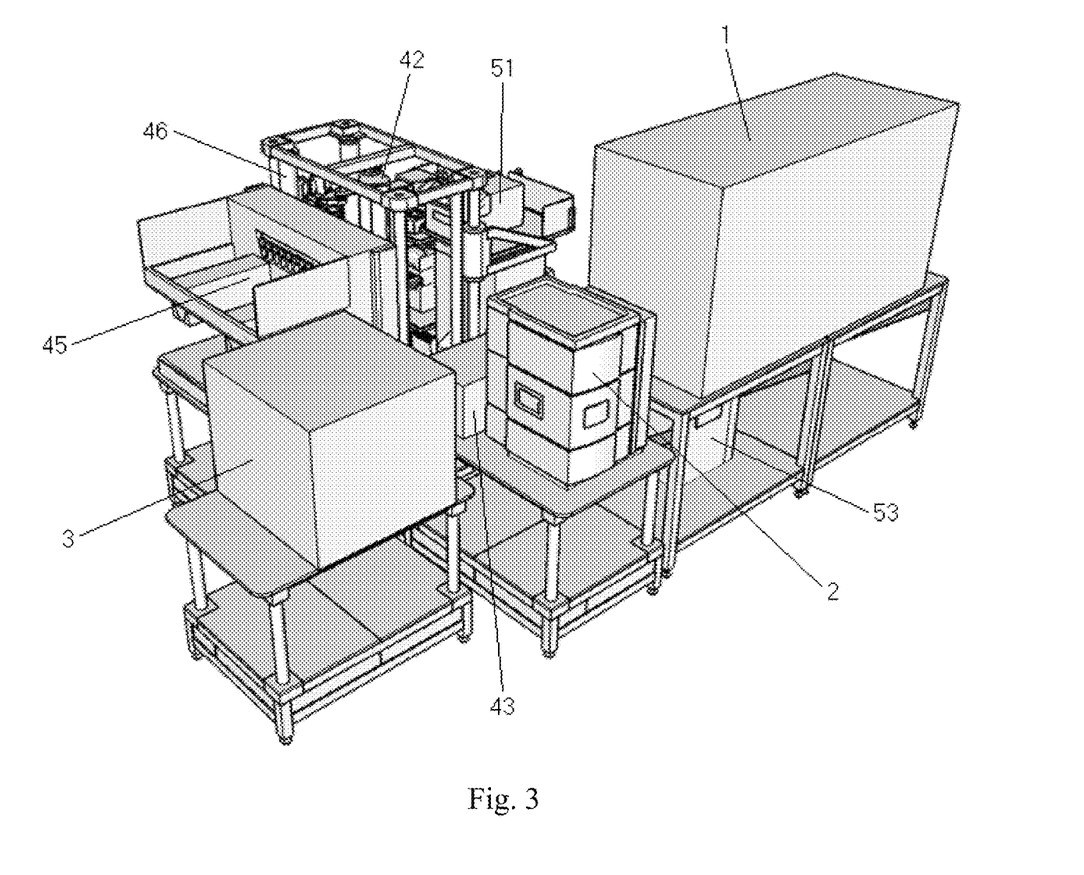
FIG. 3 is a structural schematic of the integrated machine for performing fully-automated biological evaluation and chemical analysis of the present invention from a rear view.

In the above example, preferably, as shown in FIGS. 2 and 3, the component collection module 4 essentially consists of a plate storing scaffold 41, a mechanical arm 42, a fraction collector 43, a nitrogen blower 44, a pipetting workstation 45, and a mounting scaffold 46. Wherein, the plate storing scaffold 41 is arranged on a first side of the mounting scaffold 46 for storing the plate; the mechanical arm 42 is mounted at the top of the mounting scaffold 46 for transferring the plate; the fraction collector 43 is mounted on a second side of the mounting scaffold 46 and connected with the second outlet of the three-way diverter valve 7 for collecting the liquid effluent flowed from the component separation module 2 into in the plate; the nitrogen blower 44 is mounted on a third side of the mounting scaffold 46 for nitrogen blowing the liquid effluent transferred by the fraction collector 43 in the plate to dryness; the pipetting workstation 45 is mounted on a fourth side of the mounting scaffold 46 for gradient dilution of a sample or positive control mother liquor and solution preparation.

In the above example, preferably, the biological evaluation module 5 essentially consists of an automated liquid distributor 51, a $CO_2$ incubator 52, a refrigerator 53, a plate washer 54, and a biological evaluation detector 55. Wherein, the automated liquid distributor 51 is arranged on the mounting scaffold 46 above the nitrogen blower 44 for redissolution by distributing a constant volume of organic solvent (such as methanol or acetonitrile) into the plate transferred from the nitrogen blower 44; the $CO_2$ incubator 52 is arranged between the automated liquid distributor 51 and the fraction collector 43 for cell culture and exposure to administration; the refrigerator 53 is arranged outside the $CO_2$ incubator 52 for preserving the remaining redissolved solution; the plate washer 54 is arranged on the mounting scaffold 46 below the nitrogen blower 44 for washing the plate where cell culture is completed; the biological evaluation detector 55 is arranged above the $CO_2$ incubator 52 for detecting the biological effect signals of the plate for administration where administration exposure is completed.

In the above example, preferably, the component separation module 2, the component collection module 4, and the biological evaluation module 5 are all arranged in a biologically safe cabinet to ensure that the experimental process is in a sterile environment.

Based on the integrated machine for performing fully-automated biological evaluation and chemical analysis provided by the above example, the present invention further provides a method for performing fully-automated biological evaluation and chemical analysis, comprising the steps of:

step 1: extracting, concentrating, and purifying the mother liquor to be analyzed of the sample to be analyzed in the pretreatment module 1;

step 2: the concentrated and purified mother liquor to be analyzed enters the component separation module 2 through the high-pressure liquid pump and the sample injector, and then after crude separation by an chromatographic column for analysis or a chromatographic column for preparation, a liquid effluent is split into two paths in the three-way diverter valve 7 in a proportion (for example, 1:9, 2:8, or a full proportion, etc.), and enters the monitoring and identifying module 3 and the component collection module 4, respectively;

step 3: the liquid effluent entering the monitoring and identifying module 3 sequentially passes through the ultraviolet detector and the high-resolution mass spectrometer detector prior to obtainment of a spectrogram of chromatography-mass spectrometry of the liquid effluent, and the data processing and automated control module 6 acquires the spectrogram of chromatography-mass spectrometry of the liquid effluent;

step 4: the mechanical arm 42 in the component collection module 4 grabs a plate in the plate storing scaffold 41 and places it on the fraction collector 43, and the liquid effluent entering the component collection module 4 after being split is collected in the plate via the fraction collector 43; the mechanical arm 42 transfers the plate to the nitrogen blower 44 for nitrogen blowing the liquid effluent in the plate to dryness, and then transfers the plate to the automated liquid distributor 51 for redissolution by distributing a constant volume of organic solvent into the plate; after distributing an appropriate amount of redissolved solution into another plate and nitrogen blowing it to dryness again, redissolution is performed using the biocompatible solvent (such as dimethyl sulfoxide or ethanol) to provide a mother liquor for administration, and the remaining redissolved solution is preserved in the refrigerator 53; an appropriate amount of mother liquor for administration and an appropriate amount of positive control mother liquor taken from the outside each are formulated with an appropriate amount of complete culture media suitable for cell growth into a sample exposure liquid and a positive control exposure liquid respectively at the pipetting workstation 45, and sample application of the sample exposure liquid and the positive control exposure liquid to the plate for administration is performed;

step 5: the plate for administration after the sample application is transferred to the $CO_2$ incubator 52 via the mechanical arm 42 for exposure to administration; the plate for administration is transferred to the biological evaluation detector 55 for detection of biological effect signal after exposure to administration is completed; the biological effect signal of each well in the plate for administration is acquired and a biological assay effect spectrogram is reconstructed by the data processing and automated control module 6;

step 6: the spectrogram of chromatography-mass spectrometry is overlapped with the biological assay effect spectrogram by the data processing and automated control module 6 to complete a primary screening of the biological effect activity of the mother liquor to be analyzed and determination of biological effect active components;

step 7: if the biological effect active components are still a complex mixture, steps 2-6 are repeated using the remaining redissolved solution in step 4 as a mother liquor to be analyzed, for the purpose of a further subdivision of the biological effect active components;

step 8: after the subdivided biological effect active components are determined, the remaining redissolved solution in step 4 is taken and injected into the monitoring and identifying module 3 for identification by high-resolution mass spectrometry, so as to acquire accurate mass-to-charge ratios and secondary fragment information of suspicious effectors; finally, alignment and screening of a chromatographic library of the suspicious effectors are carried out by the data processing and automated control module 6 and a list of the suspicious effectors is obtained.

In the above example, preferably, in the step 4, the steps of obtaining a plate for administration are as follows:

step ①: a plate is grabbed by the mechanical arm 42 in the component collection module 4 from the plate storing scaffold 41; after a cover is removed, the plate is rapidly distributed with liquid for cells using the automated liquid distributor 51 in the biological evaluation module 5, and transferred to the $CO_2$ incubator 52 for cell culture after the cover is recovered;

step ②: after the cell culture is completed, the plate is transferred from the $CO_2$ incubator 52 to the plate washer 54, where the initial culture medium is washed off using a phosphate buffered saline (PBS) to provide a plate for administration.

In the above example, preferably, the filler in the solid phase extractor in the step 1 is selected from adsorbents with various specifications and sample loadings including, but not limited to, a normal phase polar adsorbent, an anti-phase weak polar adsorbent, and an ion exchange adsorbent.

In the above example, preferably, the gel filler of the gel chromatograph in the step 1 includes, but is not limited to, polyacrylamide, crosslinked dextran, and agarose.

In the above example, preferably, standard matrix plates including, but not limited to, transparent plates, black/white plates, or deep-well plates having 6, 12, 24, 48, 96 and 384 wells, along with pipette tip boxes with various specifications are stored on the plate storing scaffold 41.

In the above example, preferably, the biological evaluation detector 55 includes, but is not limited to, a microplate reader, a flow cytometer, a fluorescent quantitative PCR instrument, and a DNA damage detector.

In the above example, preferably, the high-resolution mass spectrometry detector includes, but is not limited to, a time-of-flight mass spectrometry detector and an ion trap high-resolution mass spectrometry detector.

The above examples are only used for illustrating the present invention, and the structure, manner of connection, process for manufacture, etc. of each component can be changed, and equivalent changes and improvements made on the basis of the technical solution of the present invention should not be excluded from the protection scope of the present invention.

What is claimed is:

1. An integrated machine for performing fully-automated biological evaluation and chemical analysis, comprising:
a pretreatment module configured for enriching, concentrating and purifying a sample to be analyzed to provide a mother liquor to be analyzed;
a component separation module, wherein an inlet of the component separation module is connected with the pretreatment module, and an outlet of the component separation module is connected with an inlet of a three-way diverter valve, and wherein the component separation module is configured to perform a separation of multiple compounds in the mother liquor to be analyzed, to produce a separated liquid effluent;
a monitoring and identifying module, wherein an inlet of the monitoring and identifying module is connected with a first outlet of the three-way diverter valve, and wherein the monitoring and identifying module is configured for monitoring and collecting chromatographic signals of the separated liquid effluent in real time, as well as quantitative detection of suspicious compounds;
a component collection module, wherein an inlet of the component collection module is connected with a second outlet of the three-way diverter valve, and an outlet of the component collection module is split into two paths, wherein an outlet of a first path is connected with the component separation module, and wherein the component collection module is configured for collecting, transferring and dissolving, redissolving, and pipetting the separated liquid effluent;
a biological evaluation module connected with an outlet of a second path of the component collection module and configured to perform cell culture and to detect cytotoxic effect and toxic targets;
a data processing and automated control module electrically connected with the monitoring and identifying module and the biological evaluation module, respectively, and configured to acquire, arrange and analyze the integrated data;
wherein the component separation module comprises a high-pressure liquid pump, a sample injector, a chromatographic column for analysis, a chromatographic column for preparation, and a column oven; wherein, the mother liquor to be analyzed is concentrated and purified by the pretreatment module, and the high-pressure liquid pump and the sample injector are configured for introducing the mother liquor to be analyzed into the component separation module, the chromatographic column for analysis or the chromatographic column for preparation is configured to provide crude separation of the introduced mother liquor to be analyzed, and the column oven is configured for providing a constant column temperature during separation;

wherein the monitoring and identifying module comprises an ultraviolet detector in tandem with a high-resolution mass spectrometer detector, and the separated liquid effluent introduced into the monitoring and identifying module sequentially passes through the ultraviolet detector and the high-resolution mass spectrometer detector to provide a spectrogram of chromatography-mass spectrometry of the separated liquid effluent; and wherein the component collection module comprises a plate storing scaffold, a mechanical arm, a fraction collector, a nitrogen blower, a pipetting workstation, and a mounting scaffold; wherein, the plate storing scaffold is arranged on a first side of the mounting scaffold and configured for storing plates; the mechanical arm is mounted at the top of the mounting scaffold and configured for transferring one plate of the plates at a time; the fraction collector is mounted on a second side of the mounting scaffold and connected with the second outlet of the three-way diverter valve and configured for collecting the separated liquid effluent split and flowed from the component separation module into the plate; the nitrogen blower is mounted on a third side of the mounting scaffold and configured for nitrogen blowing the separated liquid effluent transferred by the fraction collector in the plate to dryness; the pipetting workstation is mounted on a fourth side of the mounting scaffold and configured for preforming gradient dilution of a sample or positive control mother liquor and solution preparation.

2. The integrated machine for performing fully-automated biological evaluation and chemical analysis according to claim 1, characterized in that the pretreatment module comprises a solid phase extractor, an accelerated solvent extractor, a gel chromatograph, and a quantitative concentrator; if the sample to be analyzed is liquid, loading and enrichment of the sample to be analyzed are carried out via the solid phase extractor, and then a proper leachate is selected for elution and extraction of the multiple compounds; if the sample to be analyzed is solid, the multiple compounds are extracted from the sample to be analyzed via the accelerated solvent extractor; after a liquid extract generated by the solid phase extractor or the accelerated solvent extractor is concentrated via the quantitative concentrator to produce a liquid concentrate, the liquid concentrate is purified in the gel chromatograph to provide the mother liquor to be analyzed.

3. The integrated machine for performing fully-automated biological evaluation and chemical analysis according to claim 1, characterized in that the biological evaluation module comprises an automated liquid distributor, a $CO_2$ incubator, a refrigerator, a plate washer, and a biological evaluation detector; wherein, the automated liquid distributor is arranged on the mounting scaffold above the nitrogen blower and configured for redissolution by distributing a constant volume of organic solvent into the plate transferred from the nitrogen blower, to produce a redissolved solution; the $CO_2$ incubator is arranged between the automated liquid distributor and the fraction collector and configured for cell culture and exposure with a part of the redissolved solution; the refrigerator is arranged outside the $CO_2$ incubator and configured for preserving a remaining redissolved solution; the plate washer is arranged on the mounting scaffold below the nitrogen blower and configured for washing the plate where cell culture is completed; the biological evaluation detector is arranged above the $CO_2$ incubator and configured for detecting the biological effect signals of a plate for administration where exposure is completed.

4. A method for performing fully-automated biological evaluation and chemical analysis based on the integrated machine for performing fully-automated biological evaluation and chemical analysis of claim 3, characterized in that it the method comprises the steps of:

step 1: enriching, concentrating, and purifying the sample to be analyzed in the pretreatment module to produce a mother liquor to be analyzed;

step 2: the mother liquor to be analyzed enters the component separation module through the high-pressure liquid pump and the sample injector, and then after crude separation through an analysis of a chromatographic column or a preparation of a chromatographic column, a liquid effluent is split into two paths in the three-way diverter valve in a proportion, and enters the monitoring and identifying module and the component collection module, respectively;

step 3: the liquid effluent entering the monitoring and identifying module sequentially passes through the ultraviolet detector and the high-resolution mass spectrometer detector to provide a spectrogram of chromatography-mass spectrometry of the liquid effluent, and the data processing and automated control module acquires the spectrogram of chromatography-mass spectrometry of the liquid effluent;

step 4: the mechanical arm in the component collection module grabs a first plate in the plate storing scaffold and places the first plate on the fraction collector, and the liquid effluent entering the component collection module after being split is collected into the first plate via the fraction collector; the mechanical arm transfers the first plate to the nitrogen blower for nitrogen blowing the liquid effluent in the first plate to dryness, and then transfers the first plate to the automated liquid distributor for redissolution by distributing a constant volume of organic solvent into the first plate, to produce a redissolved solution; after distributing an appropriate amount of the redissolved solution into a second plate which is different from the first plate and nitrogen blowing the second plate to dryness, redissolution is performed with a biocompatible solvent to provide a mother liquor for administration, and a remaining redissolved solution is preserved in the refrigerator; an appropriate amount of positive control mother liquor taken from outside of the integrated machine and an appropriate amount of mother liquor for administration each are formulated with an appropriate amount of complete culture media suitable for cell growth into a positive control exposure liquid and a sample exposure liquid, respectively, at the pipetting workstation, and sample application of the sample exposure liquid and the positive control exposure liquid to a plate for administration is performed;

step 5: the plate for administration after the sample application is transferred to the $CO_2$ incubator via the mechanical arm and then is exposed within the $CO_2$ incubator; the plate for administration is transferred to the biological evaluation detector for biological effect signal detection after exposure is completed; the biological effect signal of each cell in the plate for administration is acquired and a biological assay effect spectrogram is reconstructed by the data processing and automated control module;

step 6: the spectrogram of chromatography-mass spectrometry is overlapped with the biological assay effect spectrogram by the data processing and automated control module to complete a primary screening of the biological effect activity of the mother liquor to be analyzed and determination of biological effect active components;

step 7: if the biological effect active components are still a complex mixture, steps 2-6 are repeated using the remaining redissolved solution in step 4 as a mother liquor to be analyzed, for the purpose of a further subdivision of the biological effect active components;

step 8: after the subdivided biological effect active components are determined, the remaining redissolved solution in step 4 is taken and injected into the monitoring and identifying module for identification by high-resolution mass spectrometry, and accurate mass-to-charge ratios and secondary fragment information of suspicious effectors are acquired; finally, alignment and screening of a chromatographic library of the suspicious effectors are carried out by the data processing and automated control module and a list of the suspicious effectors is obtained.

5. The method for performing fully-automated biological evaluation and chemical analysis according to claim 4, the method further comprising the following steps to provide the plate for administration to which the sample application is to be performed in the step 4:

step ①: a third plate is grabbed by the mechanical arm in the component collection module from the plate storing scaffold, and after a cover is removed, the third plate is rapidly distributed with liquid for cells using the automated liquid distributor in the biological evaluation module, and transferred to the $CO_2$ incubator for cell culture to provide an initial culture medium after the cover is recovered;

step ②: after the cell culture is completed, the third plate is transferred from the $CO_2$ incubator to the plate washer, where the initial culture medium is washed off using a phosphate buffer solution to provide a plate for administration.

6. The method for performing fully-automated biological evaluation and chemical analysis according to claim 4, characterized in that the filler in the solid phase extractor in the step 1 is selected from a group consisted of a normal phase polar adsorbent, an anti-phase weak polar adsorbent, and an ion exchange adsorbent;

the gel filler of the gel chromatograph in the step 1 includes polyacrylamide, crosslinked dextran, and agarose.

7. The method for performing fully-automated biological evaluation and chemical analysis according to claim 4, characterized in that standard matrix plates including transparent plates, black/white plates, or deep-well plates having 6, 12, 24, 48, 96 and 384 wells, along with pipette tip boxes are stored on the plate storing scaffold;

the biological evaluation detector includes a microplate reader, a flow cytometer, a fluorescent quantitative PCR instrument, and a DNA damage detector;

the high-resolution mass spectrometry detector includes a time-of-flight mass spectrometry detector and an ion trap high-resolution mass spectrometry detector.

* * * * *